United States Patent
Minh

(10) Patent No.: US 7,675,287 B2
(45) Date of Patent: Mar. 9, 2010

(54) METHOD FOR ESTIMATING FORMATION SKIN DAMAGE FROM NUCLEAR MAGNETIC RESONANCE MEASUREMENTS

(75) Inventor: Chanh Cao Minh, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/197,531

(22) Filed: Aug. 25, 2008

(65) Prior Publication Data
US 2010/0026293 A1 Feb. 4, 2010

Related U.S. Application Data

(60) Provisional application No. 61/084,309, filed on Jul. 29, 2008.

(51) Int. Cl.
*G01V 3/00* (2006.01)
(52) U.S. Cl. .................................. 324/303; 324/300
(58) Field of Classification Search .............. 324/303, 324/306, 307, 309, 312, 318, 322, 300; 702/6–9, 702/12, 13
See application file for complete search history.

(56) References Cited

U.S. PATENT DOCUMENTS

| | | | | |
|---|---|---|---|---|
| 6,538,438 | B1 * | 3/2003 | Speier et al. | 324/303 |
| 6,710,596 | B2 * | 3/2004 | Speier et al. | 324/303 |
| 7,277,796 | B2 * | 10/2007 | Kuchuk et al. | 702/7 |

OTHER PUBLICATIONS

Ayan, C. et al., An Investigation of Near-Wellbore Flow Properties Using Sonic Scanner Measurements and Interval Pressure Transient Testing, SPE 110304.
Heaton, N. et al., Applications of a New-Generation NMR Wireline Logging Tool, SPE 77400.

* cited by examiner

*Primary Examiner*—Brij B Shrivastav
(74) *Attorney, Agent, or Firm*—Darla P. Fonseca; Jaime Castano

(57) ABSTRACT

A method for determining skin factor of a subsurface rock formation from within a wellbore drilled therethrough includes measuring a nuclear magnetic resonance property of the formation at a plurality of lateral depths therein. The measured nuclear magnetic resonance property is used to estimate the skin factor.

13 Claims, 2 Drawing Sheets

METHOD FOR ESTIMATING FORMATION SKIN DAMAGE FROM NUCLEAR MAGNETIC RESONANCE MEASUREMENTS

CROSS-REFERENCE TO RELATED APPLICATIONS

Priority is claimed from U.S. Provisional Application No. 61/084,309 filed on Jul. 29, 2008.

STATEMENT REGARDING FEDERALLY SPONSORED RESEARCH OR DEVELOPMENT

Not applicable.

BACKGROUND OF THE INVENTION

1. Field of the Invention

The invention relates generally to the field of subsurface rock formation productivity estimation. More specifically, the invention relates to methods for determining "skin" damage of a formation proximate a wellbore so that expected fluid production can be predicted.

2. Background Art

Wellbores are drilled through subsurface rock formations to extract useful substances such as oil and gas. A wellbore forms a hydraulic conduit from a permeable subsurface rock formation having oil and/or gas present therein to the Earth's surface. Oil and/or gas typically move to the surface through the wellbore by the force of gravity. Gravity manifests itself as a pressure drop between the fluid pressure in the pore spaces of the subsurface rock formation and the wellbore. The rate at which the oil and/or gas move into the wellbore and to the surface depends on the pressure drop between the formation and the wellbore, the viscosity of the oil and/or gas, and the permeability of the rock formation to the oil and/or gas.

It is known in the art that the permeability of a rock formation can be affected by the process of drilling a wellbore therethrough. Such effects can result from migration of small particles in the fluid ("drilling mud") used to drill the wellbore, reaction of certain formation minerals (e.g., clay minerals such as kaolinite and chlorite) disposed in the pore spaces with the liquid phase of the drilling mud and/or mechanical and chemical alteration of the formation by the action of drilling the wellbore. A typical effect is to reduce the permeability of the rock formation proximate the wellbore. Such near-wellbore permeability reduction is referred to as "skin effect" or "skin damage" and may result in lower oil and/or gas flow rates than would be expected for the particular rock formation and/or higher pressure drop from the formation to the wellbore.

For certain formation evaluation procedures, for example, formation fluid testing using wellbore instruments conveyed into the wellbore, existence of skin damage may result in test failure or false indication that a particular formation is not likely to be productive of oil and/or gas. The existence of skin damage may be confirmed by more extensive testing of the formations, and remedial operations can be performed to overcome the production rate loss resulting from skin damage, however there exists a need to evaluate possible skin damage quickly and efficiently so as to reduce the number of formations improperly identified as non-productive, to reduce the number of formation tests that are failure prone and to identify subsurface formations that may benefit from remedial operations to correct skin damage.

SUMMARY OF THE INVENTION

A method according to one aspect of the invention for determining skin factor of a subsurface rock formation from within a wellbore drilled therethrough includes measuring a nuclear magnetic resonance property of the formation at a plurality of lateral depths therein. The measured nuclear magnetic resonance property is used to estimate the skin factor.

A method for subsurface formation evaluation according to another aspect of the invention includes moving a well logging instrument along a wellbore drilled through subsurface rock formations. While moving the instrument along the wellbore, a nuclear magnetic resonance property of the formation is measured at a plurality of lateral depths into the formations. The measuring the property includes inducing a static magnetic field in the formations, inducing a pulsed radio frequency magnetic field in the formations at a plurality of different selected frequencies and measuring radio frequency energy from the formation induced by nuclear magnetic resonance phenomena at each of the selected frequencies. The measured nuclear magnetic resonance property is used to estimate a skin factor of the formations at a selected lateral depth from a wall of the wellbore.

Other aspects and advantages of the invention will be apparent from the following description and the appended claims.

DETAILED DESCRIPTION

Figure 1:
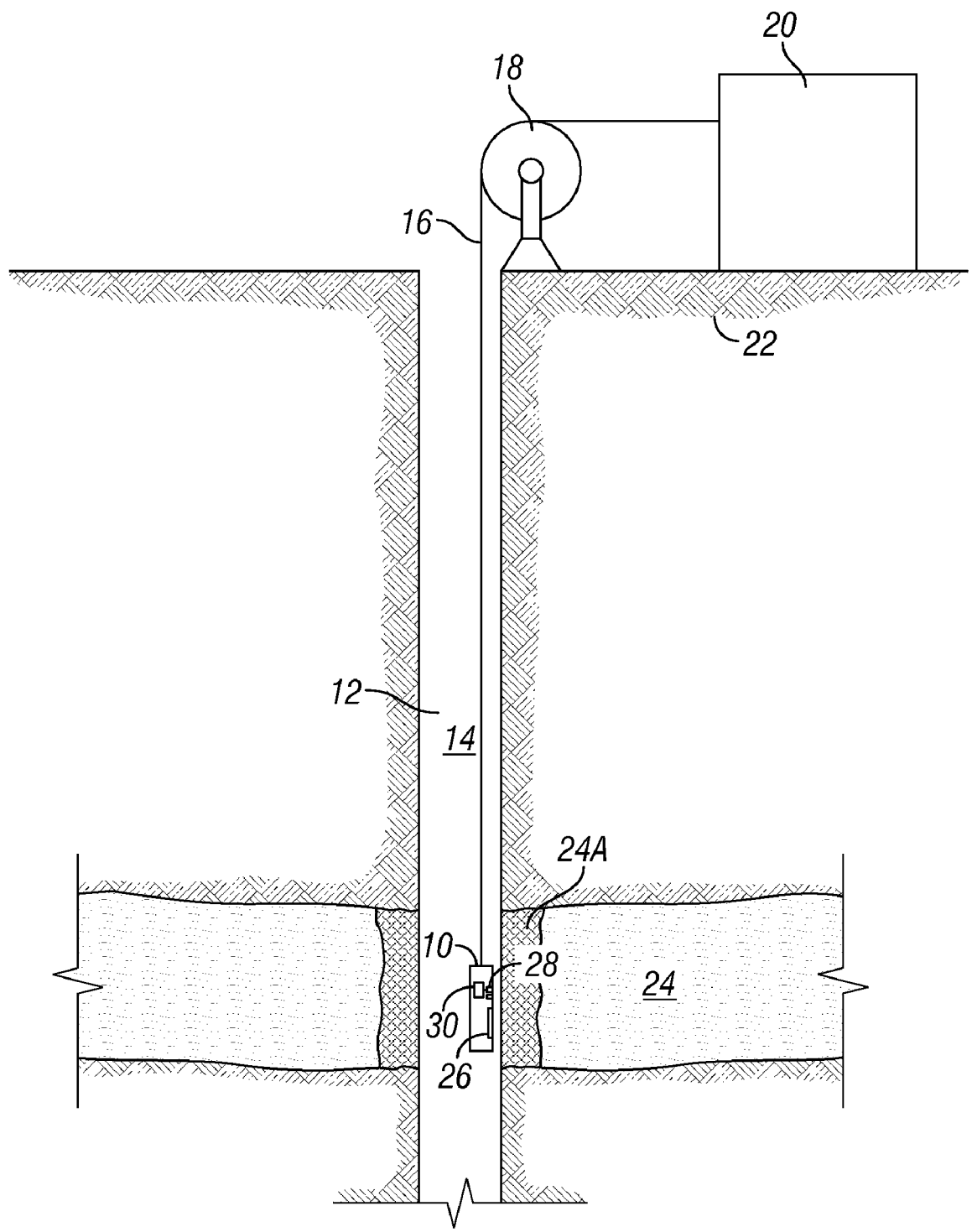
FIG. 1 shows an example of a nuclear magnetic resonance well logging instrument moved through a wellbore drilled through subsurface rock formations.

FIG. 1 shows an example of a nuclear magnetic resonance ("NMR") well logging instrument 10 being moved along a wellbore 12 drilled through subsurface rock formations 22, including one or more permeable rock formations 24. The instrument 10 may be moved along the interior of the wellbore 12 at the end of an armored electrical cable 16 ("wireline") deployed by a winch 18 or similar device known in the art. The instrument 10 may be in signal communication with a surface deployed "recording unit" 20 that may include systems (not shown separately for clarity of the illustration) for providing electrical power to operate the instrument 10, to receive and decode signals from the instrument 10 and to make a recording, indexed with respect to depth of the instrument in the wellbore or indexed with respect to time, of the signals transmitted from the instrument 10 to the recording unit 20.

While wireline deployment is shown in FIG. 1, it is to be clearly understood that such deployment is only an example of possible deployment of an instrument that may be used with the invention. Other deployment devices that may be used include, without limitation, deployment in or on a string of drill pipe, on a coiled tubing, at the end of "slickline" (single, solid strand wire or cable), in or on a production tubing, casing or other tubular device known in the art. Such deployment may be made while the wellbore 12 is being drilled (logging while drilling) or thereafter (logging while tripping or other conveyances including wireline and slickline).

As explained in the Background section herein, the wellbore 12 may include drilling mud 14 or similar fluid used during the drilling of the wellbore 12. In certain cases, the drilling mud 14 may interact with certain permeable formations (e.g., 24) so as to affect permeability of the formation proximate the wellbore. Such permeability-affected zone is indicated as a "damaged zone" at 24A and may have lower permeability than the remainder of the formation 24 laterally more distant from the wellbore 12. In methods according to the invention, measurements made by the well logging instrument 10 may be used to determine formation permeability at several different lateral distances from the wellbore wall into the formation 24, and such determinations may be used to estimate the amount of skin effect.

The well logging instrument 10 is configured to make NMR measurements, and may include a magnet 26 to prepolarize susceptible atomic nuclei in the formation 24, typically hydrogen, along the direction of the magnetic field induced by the magnet 26. The instrument 10 may include one or more radio frequency ("RF") antennas 28 coupled to suitable energizing and detecting circuitry 30 to induce NMR phenomena in the formation 24 and to detect NMR phenomena from within the formation 24. The detected NMR phenomena can be used to determine, for example, permeability of the formation at a plurality of lateral distances from the wellbore wall.

The instrument 10 may be one that is used to provide formation evaluation services under the service mark MR SCANNER, which is a mark of the assignee of the present invention. Irrespective of the particular instrument used in various examples, the instrument 10 should be capable of making NMR measurements from within a plurality of different selected sensitive volumes each located at a different lateral depth into the formation 24 from the wall of the wellbore. Examples of instrument configuration capable of making such measurements can include having the magnet configured to induce a static field having known amplitude distribution in the formation. The frequency of the RF magnetic field may be selected to excite the susceptible nuclei (e.g., hydrogen) in various regions in the formation depending on the amplitude distribution of the static magnetic field. In one example, a plurality of different RF magnetic field frequencies is used, each one inducing NMR phenomena in a different sensitive volume as a result of the amplitude distribution of the static magnetic field. Typically the RF magnetic field is oriented to be substantially orthogonal to the static magnetic field at least in the various sensitive volumes.

The pulsed RF magnetic field may include a first pulse of selected amplitude and duration to, for example, transversely realign (rotate, e.g., 90 degrees) the magnetic spin axes of the susceptible nuclei, followed, after a selected time interval, by a plurality of pulses spaced apart in time from each other by the same time interval, and having amplitude and duration selected to invert the magnetic spin axes of the susceptible nuclei by a selected angle (e.g., 180 degrees). After each such reorientation pulse, NMR spin echo signals may be detected. One such RF pulsing and signal detection sequence is the well known Carr-Purcell-Meiboom-Gill sequence. Amplitude of each NMR spin echo signal so detected may be related to the nuclear magnetic relaxation properties of the formation at each of the selected lateral depths into the formation. One non-limiting example of an NMR property that may be determined using such RF pulsing and measurement sequences is the transverse relaxation time ($T_2$).

Two example relationships can be used to convert the determined relaxation time to permeability. These are the Schlumberger-Doll Research ("SDR") relationship:

$$k_{SDR}=A(\emptyset_{NMR})^4(T_2 \text{ log mean}) \quad (1)$$

and the Timur ("BWP") relationship which is based on irreducible water volume:

$$k_{BWP}=A(\emptyset)^4[(\emptyset-BV_{irr})/BV_{irr}]^2 \quad (2)$$

where $k_{BWP}$ is bulk water permeability, BVirr is bulk volume irreducible water, which may be determined from, for example, NMR T2 measurements, and Ø represents porosity (fractional volume of pore space in the rock formation). In the SDR relationship, the porosity may be determined, for example, from the NMR measurements. In the Timur relationship, the porosity may be determined, for example, from other well logging measurements, such as bulk density and neutron porosity. Each of the foregoing methods requires a different calibration constant 'A', which can be determined from experimental data and formation porosity. Thus, from the NMR measurements made at each lateral depth into the formation, a corresponding value of permeability may be estimated or determined.

The foregoing determinations of permeability may be performed for two or more of the plurality of different lateral depths investigated by the NMR well logging instrument. Thus, at each longitudinal position (depth) in the wellbore, a plurality of NMR measurements and a corresponding plurality of permeability values may be determined. The permeability values may be used to estimate the skin factor as will be explained below. Skin factor (S) may be represented by the following expression:

$$S=(K/K_s-1)\ln(r_s/r_w) \quad (3)$$

wherein K represents the undamaged or native formation horizontal permeability, Ks represents the damaged zone horizontal permeability, $r_s$ represents the radius of the damaged zone (e.g., 24A in FIG. 1) from the center of the wellbore, and $r_w$ is the radius of the borehole. For the MR SCANNER well logging instrument that may be used in some examples, NMR measurements are made at lateral depths of 1.5 inches (38 mm), 2.7 inches (68 mm) and 4 inches (101 mm) into the formation from the wall of the wellbore.

Figure 2:
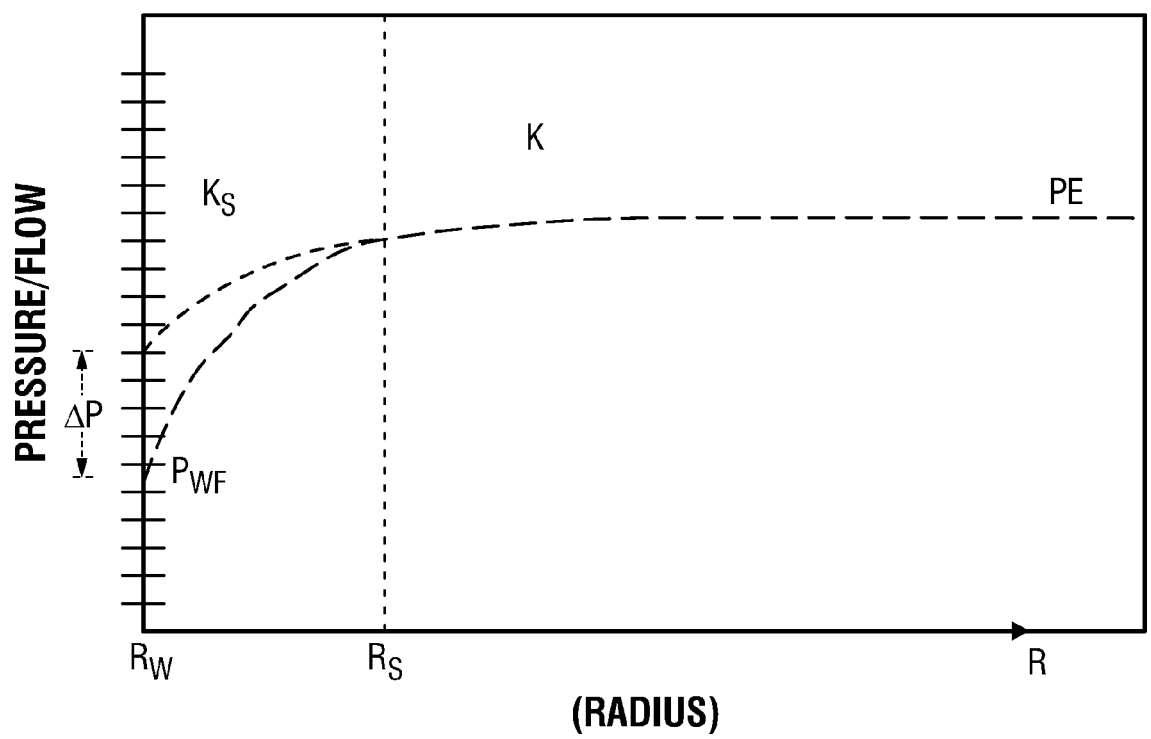
FIG. 2 shows a radial pressure profile of a subsurface reservoir in the presence and in the absence of skin damage.

How skin effect affects pressure and flow rate can be observed in the graph of FIG. 2. At a relatively large distance from the wellbore (indicated on the coordinate axis at r) the pressure in the subsurface formation is essentially unaffected by pressure drop caused by fluid flowing into the wellbore. At closer distances to the wellbore, the formation fluid pressure will drop by an amount depending on the flow rate and the permeability of the formation. The solid line of the graph extending toward the radius of the wellbore $r_w$ indicates the flowing pressure profile in the presence of skin damage, wherein the skin damage extends to a radius into the formation indicated by $r_s$. The pressure or flow rate, indicated on the ordinate axis of FIG. 2, shows that the flowing pressure in the wellbore $p_{wf}$ is typically substantially lower than the corresponding pressure and flow rate in the absence of skin damage, shown by the dashed curve section of the graph terminating at a pressure value of $p_{wf}+\Delta p_{skin}$. Permeability values k and $k_s$ for the undamaged and skin damaged formation, respectively are shown in their lateral positions in the graph in FIG. 2.

In one example, a skin factor S can be estimated for the 1.5 inch depth of investigation ("DOI") NMR measurements, for the 2.7 inch DOI NMR measurements, for the 4 inch DOI NMR measurements made by the above referenced MR SCANNER instrument, if undamaged permeability is estimated from other measurements or data. In one example, undamaged permeability may be extrapolated from the permeability measurements made at each DOI by the foregoing NMR well logging instrument.

The concept of pseudo-wellbore radius, r'w caused by skin effect may be represented by the expression:

$$r'_w = r_w e^{-S} \quad (4)$$

Thus, after computing S for the shallower DOI NMR measurements, the above equation can be used to estimate r'w. Skin factor for successively larger DOI measurements can then be calculated by substituting $r_w$ in equation (3) with r'w determined from equation (4). The foregoing may be repeated for each set of successively larger DOI NMR measurements.

If the deepest (4 inch) DOI measurements provide the undamaged formation horizontal permeability (as often occurs in practice), then the skin factors for smaller DOI measurements (e.g., 1.5 inch and 2.7 inch DOI) can be computed as follows:

$$S_{1.5} = (K_4/K_{1.5} - 1)\ln(1 + 1.5/r_w) \quad (5)$$

$$r'_{w,1.5} = r_w e^{-S1.5} \quad (6)$$

$$S_{2.7} = (K_4/K_{2.7} - 1)\ln(1 + 2.7/r'_{w,1.5}) \quad (7)$$

The skin factor can further be used to estimate an excess drawdown pressure (an amount by which pressure in the wellbore must be reduced below that of an undamaged formation to obtain the same fluid flow rate, related to $\Delta p_{skin}$ explained above) caused by formation damage, and a reduced productivity index according to the following equations:

$$\Delta P = 142.2(q\mu Bo/Kh)S \quad (8)$$

$$PI = 0.00708Kh/(\mu Bo \ln(r_e/r_w) + S) \quad (9)$$

wherein $\Delta P$ is the skin excess pressure drawdown (in pounds per square inch), q is the fluid flow rate (in stock tank barrels per day), $\mu$ is the formation fluid viscosity (in centipoises), Bo is the formation volume factor (usually expressed for oil and in stock tank barrels per reservoir barrel) K is the permeability (in darcies), S is the dimensionless skin factor, PI is the productivity index (dimensionless) h is rock formation layer thickness (in feet), and $r_e$ is the effective drainage radius of the subsurface rock formation (in feet).

Methods according to the invention may enable estimating skin factor for a plurality of different formations penetrated by a wellbore using only a single well logging run, thus saving substantial time and cost. By estimating skin factor beforehand, it may be possible to select particular formations for fluid and/or pressure transient testing, such as by wireline formation testing instrument, that are more likely to be successfully tested. Such may avoid the expense and lost time of testing formations more susceptible to flow and/or pressure test failure. It may be possible to identify possibly hydrocarbon productive formations that would benefit by remedial operations to overcome skin effect, such as by hydraulic fracturing or acidizing.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a skin factor of a subsurface formation from within a wellbore drilled therethrough, comprising:

providing a nuclear magnetic resonance tool disposed in the wellbore;

measuring, using the nuclear magnetic resonance tool, a nuclear magnetic resonance property of the formation at a plurality of lateral depths therein;

estimating, without using local pressure information, one or more permeabilities of the formation using the measured nuclear magnetic resonance property; and determining the skin factor using the one or more permeabilities of the formation.

2. The method of claim 1 wherein the measured nuclear magnetic resonance property comprises transverse relaxation time.

3. The method of claim 1 wherein the estimating the one or more permeabilities of the formation is done for each lateral depth.

4. The method of claim 3 wherein the measured nuclear magnetic resonance property comprises transverse relaxation time and the one or more permeabilities are estimated from a logarithmic mean thereof.

5. The method of claim 1 further comprising repeating the measuring the nuclear magnetic resonance property, the estimating the one or more permeabilities, and the determining the skin factor at a plurality of different longitudinal positions along the wellbore.

6. The method of claim 1, wherein the nuclear magnetic resonance tool is deployed on a wireline, a drill string, a slick line, a coiled tubing, production tubing, or casing.

7. The method of claim 1, wherein the skin factor is for oil, water, or gas.

8. A method to evaluate a subsurface formation, comprising:

moving a nuclear magnetic resonance logging instrument along a wellbore drilled through the subsurface formations;

while moving the instrument along the wellbore, measuring a nuclear magnetic resonance property of the formation at a plurality of lateral depths therein, the measuring the property including inducing a static magnetic field in the formation, inducing a pulsed radio frequency magnetic field in the formations at a plurality of different selected frequencies, and measuring radio frequency energy from the formation induced by nuclear magnetic resonance phenomena at each of the selected frequencies;

estimating, without using local pressure information, one or more permeabilities of the formation using the measured nuclear magnetic resonance property; and determining a skin factor of the formations at a selected lateral depth from a wall of the wellbore using the one or more permeabilities of the formation.

9. The method of claim 8 wherein the measured property comprises transverse relaxation time.

10. The method of claim 8 wherein the estimating the one or more permeabilities of the formation is done for each lateral depth.

11. The method of claim 10 wherein the measured nuclear magnetic resonance property comprises transverse relaxation time and the one or more permeabilities are estimated from a logarithmic mean thereof.

12. The method of claim 8, wherein the nuclear magnetic resonance instrument is deployed on a wireline, a drill string, a slick line, a coiled tubing, production tubing, or casing.

13. The method of claim 8, wherein the skin factor is for oil, water, or gas.

* * * * *